United States Patent [19]

Reimert

[11] Patent Number: 4,659,119
[45] Date of Patent: Apr. 21, 1987

[54] LATCHING CONNECTOR

[75] Inventor: Larry E. Reimert, Houston, Tex.

[73] Assignee: Dril-Quip, Inc., Houston, Tex.

[21] Appl. No.: 566,572

[22] Filed: Dec. 29, 1983

[51] Int. Cl.⁴ ............................................. F16L 37/22
[52] U.S. Cl. ........................................ 285/82; 285/91; 285/93; 285/318
[58] Field of Search ................. 285/82, 84, 85, 91, 285/93, 318, 333, 334, 244, DIG. 22; 267/166, 180

[56] References Cited

U.S. PATENT DOCUMENTS

| | | |
|---|---|---|
| 439,981 | 11/1890 | Stewart .................................. 285/84 |
| 2,341,670 | 2/1944 | Stinson . |
| 2,418,418 | 4/1947 | Martin et al. . |
| 3,062,568 | 11/1962 | Andresen et al. . |
| 3,104,583 | 9/1963 | Gasche . |
| 3,325,036 | 6/1967 | Gasche et al. . |
| 3,400,950 | 9/1968 | Quebe et al. . |
| 3,419,079 | 12/1968 | Current . |
| 3,468,563 | 9/1969 | Duret ................................... 285/334 |
| 4,410,204 | 10/1983 | Reimert .................................. 285/24 |
| 4,491,351 | 1/1985 | Gall, Jr. et al. ..................... 285/318 |

FOREIGN PATENT DOCUMENTS 963281 2/1975 Canada .

Primary Examiner—Richard J. Scanlan, Jr.
Assistant Examiner—Eric K. Nicholson
Attorney, Agent, or Firm—Browning, Bushman, Zamecki & Anderson

[57] ABSTRACT

A connector assembly includes a pin connector for receipt by a box connector. An external surface of the pin features a helical groove; a generally complementary internal surface of the box features a helical groove of the same rotational sense and pitch. A helical latch coil is carried in one of the grooves, extending partly out of the groove. The connectors are latched together by stabbing the pin into the box, whereby the latch coil is ratcheted into place, partly extending into the groove of the connector not carrying the coil. Subsequent mutual rotation between the connectors in one rotational sense tightens the latched connection; rotation in the opposite sense releases the latching.

38 Claims, 31 Drawing Figures

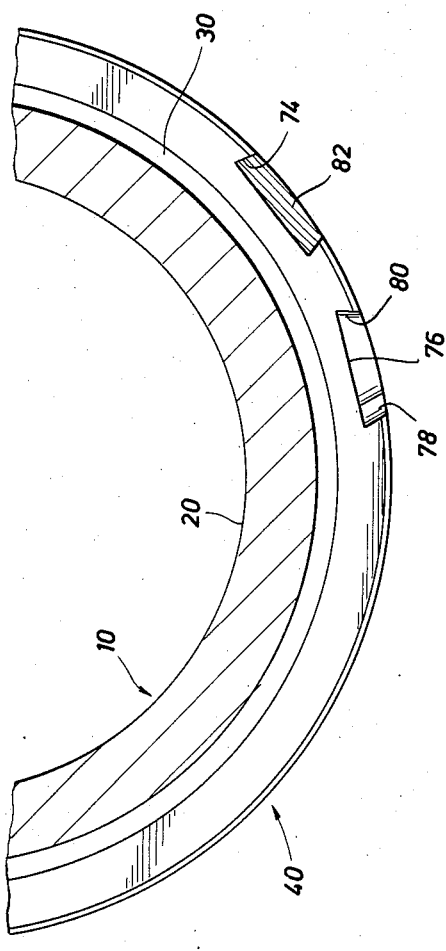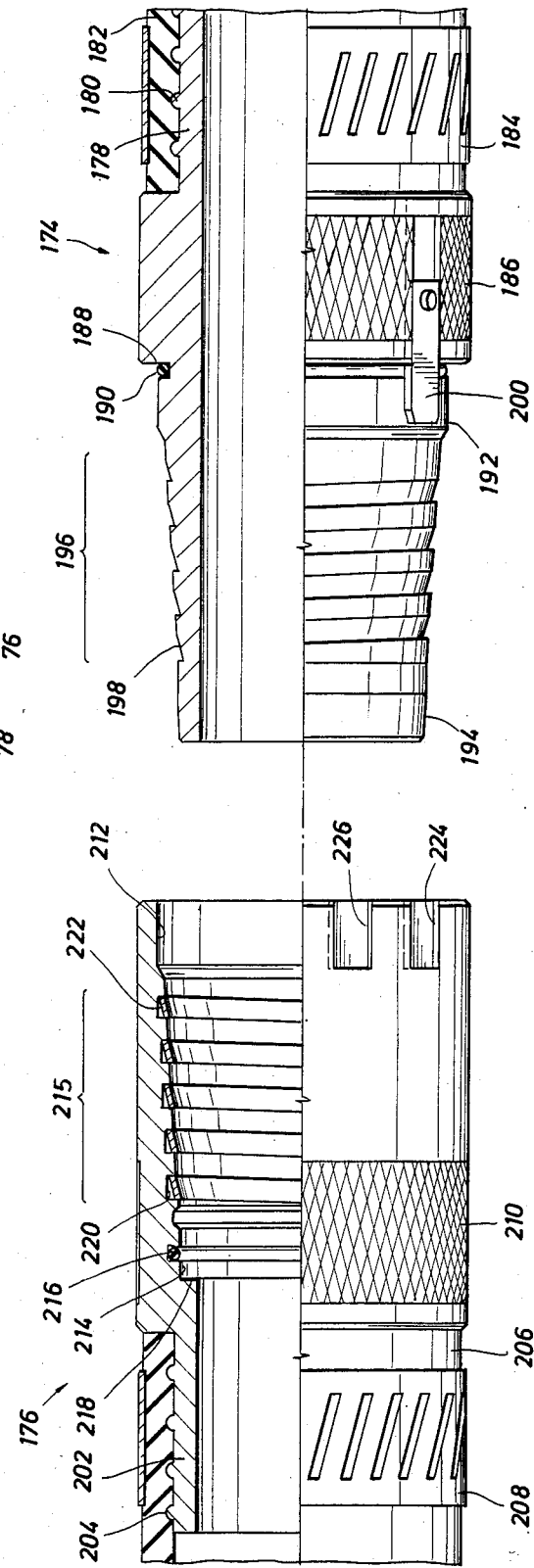

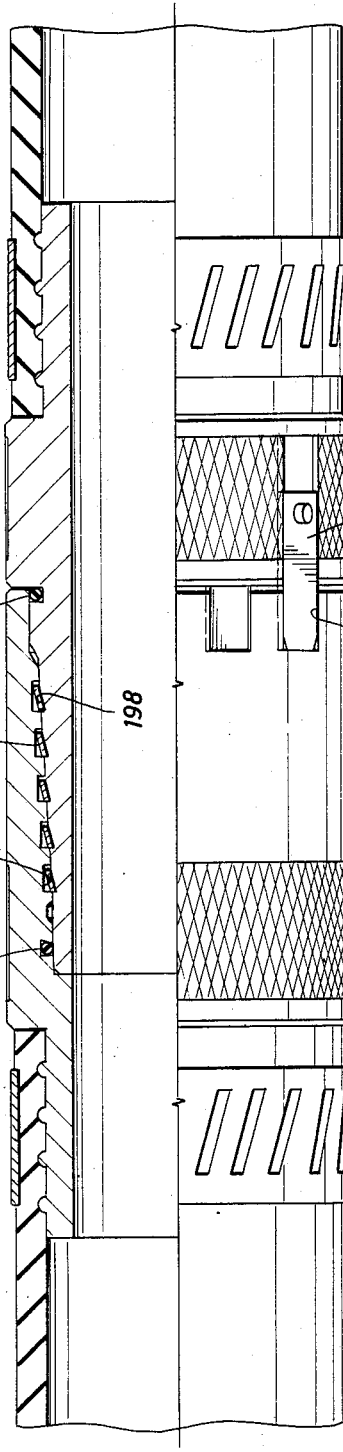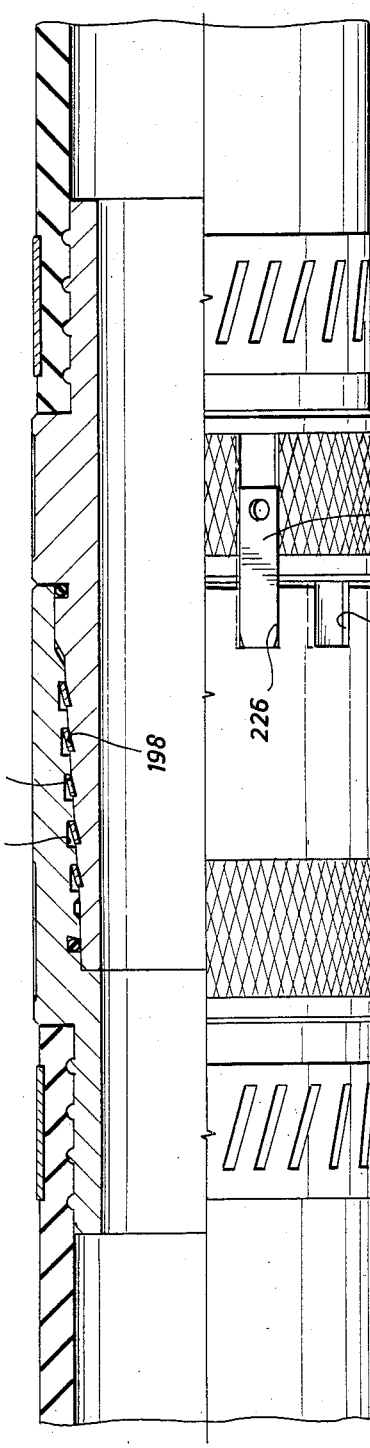

FIG. 25
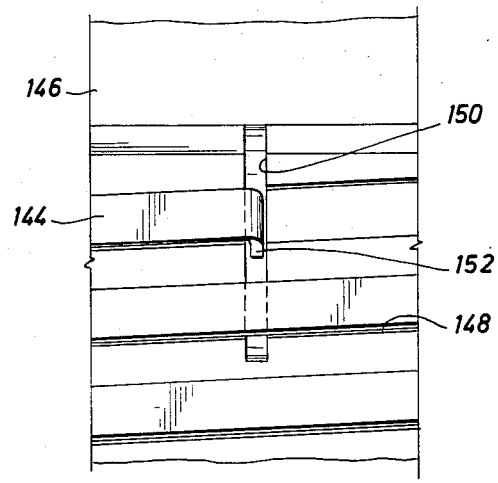
FIG. 26
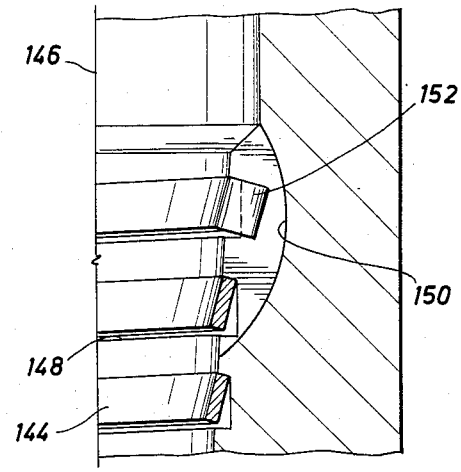
FIG. 27
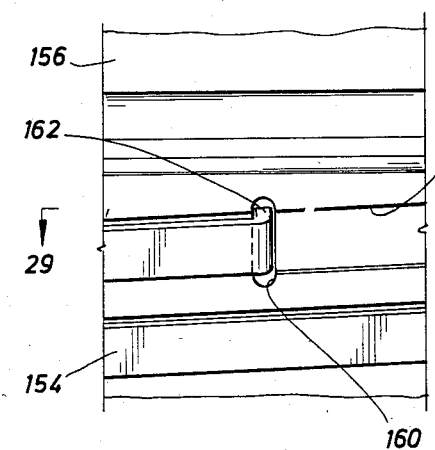
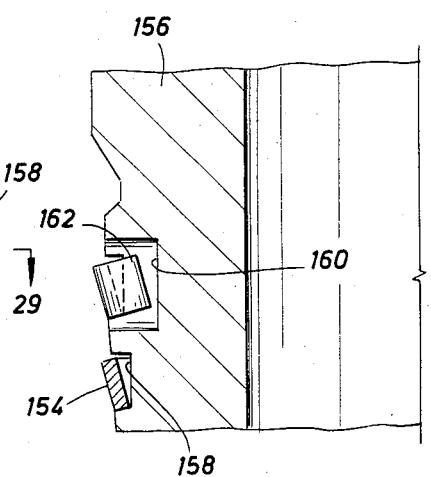
FIG. 28
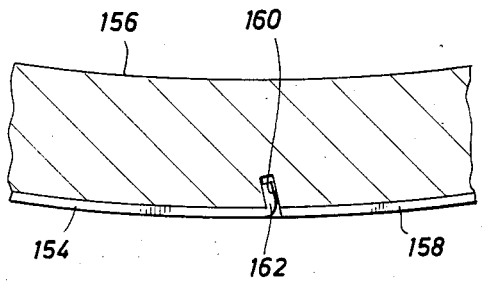
FIG. 29

LATCHING CONNECTOR

BACKGROUND OF THE INVENTION

1. Field of the Invention

The invention pertains to connectors for tubular members and the like. More particularly, the invention relates to connector assemblies which may be closed without mutual rotation between the assembly members, and finds particular application to the make-up of pipe strings which may then be driven into the ground, for example.

2. Description of the Prior Art

Offshore oil and gas drilling operations typically include the make-up of strings of pipe or casing members, usually of relatively large diameter. The tubular strings may be driven into the ground underwater to be used for anchoring the drilling platform. Such strings are also used as conduits through the water through which a well may be initiated. The joint between members of such tubular strings must provide both structural and fluid pressure integrity. Such features of a joint might be provided by welding. However, since welding is a time-consuming operation, and drilling rig rates are high, particularly offshore, mechanical connectors are generally preferred. Typical mechanical connectors available include the threaded type, in which tubular members are mutually rotated to thread a pin and box connector assembly, for example, breach block connectors in which the connector assemblies mutually engage and are then rotated 30° to 60°, for example, and snap lock connectors. In offshore operations in particular, the installation of such pipe strings may occur prior to the availability of drilling equipment. Consequently, it is preferred to have a connector type that can be quickly made up without the aid of extensive and large rotating torque equipment. Therefore, it is desirable to have a connector assembly which may be closed and latched without the need for extensive rotation of the connector members. Additionally, a preferred connector assembly will provide the needed structural integrity without the need for additional wall thickness that might be needed to accommodate typical snap lock connectors, for example.

SUMMARY OF THE INVENTION

The present invention provides method and apparatus for closing and mutually latching connector members without mutual rotation. The connector members, which may be positioned at opposite ends of tubular members to be mutually connected to make up a tubing string, provide a quick make-up which may be released by mutual rotation in one sense, but which may be locked together by mutual rotation in the opposite sense after the complementary connectors have been closed and latched by stabbing.

A first connector member includes an internal surface circumscribing and defining, at least in part, a recess which may receive a second connector member having an external surface generally complementary to the internal surface of the first member. Each of the surfaces is broken by a helical groove with the two grooves exhibiting the same rotational sense and the same pitch. A helical latch coil is carried in one of the grooves, that is, is carried in either the groove of the internal surface of the first member or the groove of the external surface of the second member. In either case, the coil in a generally relaxed state extends partly into the groove of the member carrying the coil and partly out of the groove. As the second member is stabbed into the first member, the surface of the member not carrying the latch coil contacts the latch coil and twists it, driving it into the groove of the member carrying the coil. As the second member is further positioned within the first member, the grooves of the two members generally align, at least in part, permitting the latch coil to relax and extend partly into the groove of the other member not carrying the coil. The two members are then latched together by means of the latch coil extending into the grooves of both the first and second members.

The internal and external surfaces of the first and second connector members, respectively, may be tapered, or generally frustoconical, and the corresponding grooves may accordingly be conical. The latch coil carried by either of the members would also be generally conical. With sufficient taper, contact by the surface of the other connector member with the latch coil to temporarily drive the coil into the carrying groove need occur during no greater longitudinal movement between the members than the pitch of the coil and grooves.

A seal member may be carried by at least one of the first and second members to provide sealing engagement with an appropriate surface of the other connector member when the two connector members are so latched together by means of the latch coil. Additionally, the first connector member may feature at least one internal receptacle surface for receiving corresponding external guide surfaces as part of the second connector member. The guide surfaces may be so received by the receptacle surfaces as the second member is being received by the first member to urge the members into mutual alignment to facilitate the closure of the connector assembly.

A connector assembly according to the present invention may also include apparatus carried by one or both of the connector members whereby the connector members may be mutually rotationally oriented for receipt of the second member by the first member. In one embodiment of the invention, for example, a block is carried by one of the connector members to be received in a slot in the other connector member, ensuring the desired rotational orientation between the connector members. In another embodiment, a tab extends longitudinally from one of the connector members to be received in a slot in the other member. Still another embodiment utilizes fiducial markings on the connector members by which the desired rotational orientation may be located.

A connector assembly according to the present invention may also include apparatus whereby, after the first and second connector members are mutually latched by the latch coil, the members may be mutually rotated about their common longitudinal axis. Such motion in one rotational sense effects a tightening and locking of the latch connection between the connector members by so tightening and locking the latch coil in the grooves of the two connector members. Mutual movement between the two members in the opposite rotational sense unlocks the latch connection if locked, and may be carried out to release the latching connection of the latch coil from such connector member not initially carrying the latch coil, thereby releasing the latching connection between the first and second members for opening of the connector assembly. In the tightened and locked configuration achieved by rotation following latching of the first and second members by the latch coil, a lock block may be inserted within appropriate slots provided in the two connector members and appropriately mutually aligned in the locked configuration to prevent rotational movement between the two connector members, thus holding the connector members rigidly locked in such configuration.

To facilitate the distortion of the latch coil as the latch coil is driven into the groove of the member carrying the coil by the surface of the other connector member, the coil may be broken along the side thereof flexing in the distortion process by one or more recesses, or profiles, to permit the necessary extension of that flexing edge of the coil. For any given application, the latch coil may be preferably carried internally in a first connector, where more protection of the latch coil is desired for example, or externally on a second connector, for ease of mounting of the coil for example.

The present invention thus provides apparatus and method for effecting quick make-up connections that feature easy stabbing of the connector members as well as structural strength and pressure integrity. Additionally, the connection may be complete, including sealing, with the connector members latched together without rotation. Subsequent mutual rotation between the connector members in one rotational sense locks and tightens the latched connection between the connector members by tightening the latch coil in the grooves of the two connector members, and rotational motion between the connectors in the opposite rotational sense releases the latching connection therebetween for separation of the connector members.

The present invention is applicable to tubular members in general. For example, the present invention may be employed in the make-up of strings of casing members and the like utilized in offshore drilling operations, and may be employed to connect even flexible tubular members, such as hoses.

BRIEF DESCRIPTION OF THE DRAWINGS

FIG. 17 is a partial transverse cross section of the latched connectors, taken along line 17—17 of FIG. 3, and illustrating details of the structure of the orientation and locking slots of the box connector;

FIG. 19 illustrates another embodiment of the present invention, featuring pin and box connectors similar to those previously illustrated, but particularly applicable to flexible tubular members and the like, and including a tab member for orienting and locking the pin and box connectors relative to mutual rotational orientation, the two connectors being shown aligned for insertion of the pin member into the box member;

FIG. 20 is a quarter section of the pin and box connectors of FIG. 21 joined together and mutually latched by the latch coil;

FIG. 21 is a view similar to FIG. 20, but with the pin and box connectors mutually rotated to the locked configuration, and with the orienting and locking tab positioned in the locking slot;

FIG. 25 is a fragmentary elevation of the internal surface of a box connector according to the present invention, featuring a lefthand helical groove, and carrying a helical latch coil, illustrating the manner of anchoring an end of the coil on the connector member;

FIG. 26 is a fragmentary cross section of the box member illustrated in FIG. 25, further illustrating the manner of anchoring the latch coil;

FIG. 27 is a fragmentary elevation of the external surface of a pin member according to the present invention, carrying a helical latch coil, illustrating the manner of anchoring an end of the latch coil on the pin member;

FIG. 28 is a fragmentary cross section of the pin member of FIG. 27, further illustrating the manner of anchoring the latch coil; and FIG. 29 is a transverse cross section taken along line 29—29 in FIG. 27 and further illustrating the manner of anchoring the latch coil.

DESCRIPTION OF PREFERRED EMBODIMENTS

Figure 1:
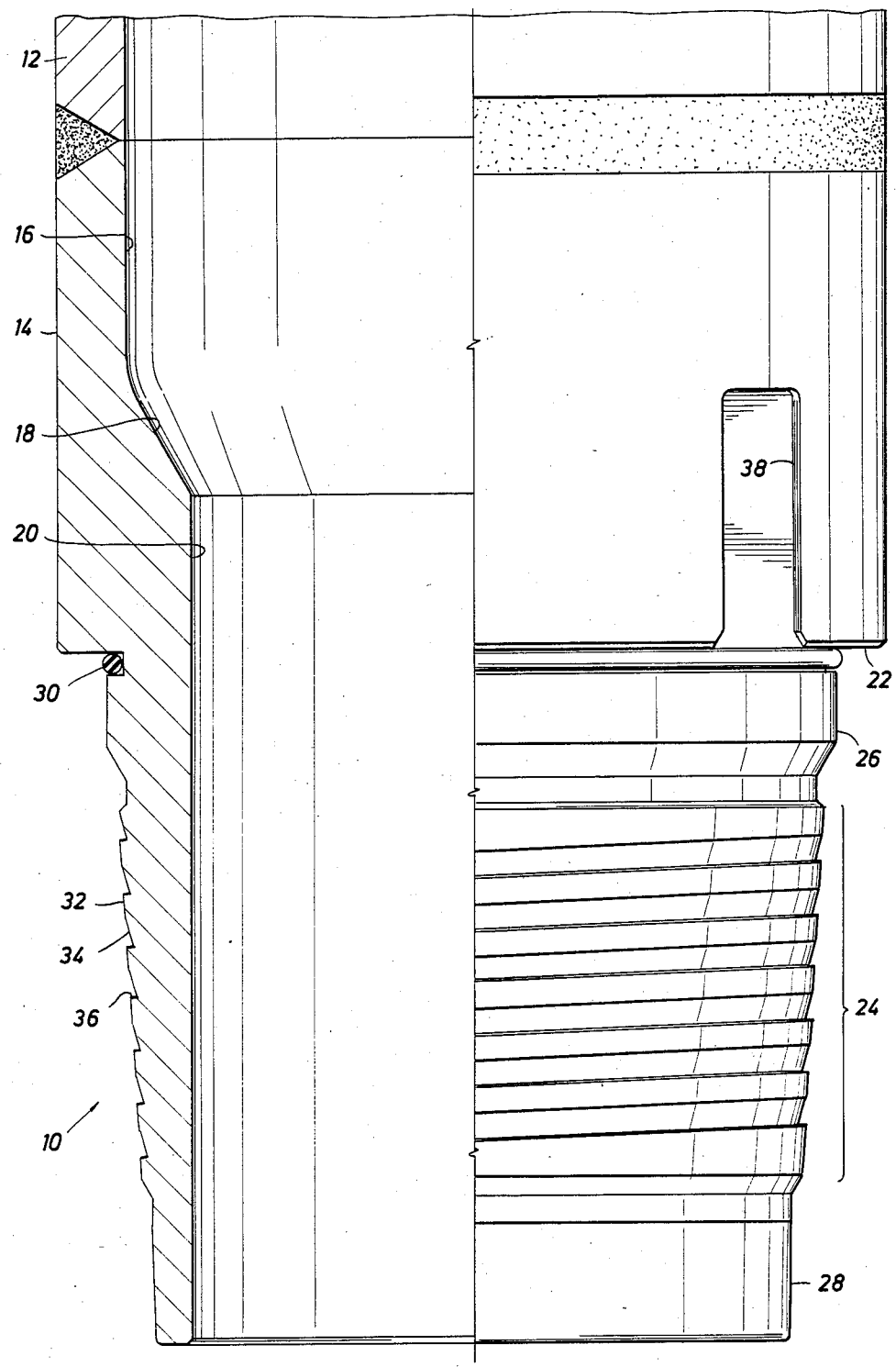
FIG. 1 is a longitudinal quarter section of a pin connector in accordance with the present invention.

A pin connector member according to the present invention is shown generally at 10 in FIG. 1, welded to one end of a tubular member 12. The tubular pin member 10 extends from the tubular member 12 in a generally cylindrical base portion 14. The internal passage of the tubular member 12 is continued within the pin base portion 14 in a generally cylindrical passage section 16, which may be of the same transverse cross section as the passage of the tubular member 12 as indicated. A frustoconical shoulder 18 narrows the internal pin passage from the cylindrical portion 16 to a cylindrical passage 20 of lesser transverse cross section and which continues to the open end of the pin member 10.

The base portion 14 ends in an annular landing surface 22, beyond which is a neck portion 24. Between the shoulder 22 and the neck 24 is positioned an annular guide surface 26. Beyond the neck 24 and extending generally to the end of the pin member 10 is a second guide section 28, slightly tapered and which also serves as a seating surface as discussed hereinafter. An O-ring seal 30 resides in an appropriate annular groove between the first guide section 26 and the shoulder 22 to engage a seating surface on a box connector as discussed hereinafter.

The neck portion 24 includes an external frustoconical surface 32 extending generally from the vicinity of the first guide surface 26 to that of the second guide surface 28, the latter guide surface being of a lesser transverse cross section than the former guide surface. The tapered surface 32 is broken by a helical groove 34. Since the groove 34 is generally uniform about and along the tapered surface 32, the groove is also conical in general shape. Details of the structure of the groove 34 may be appreciated by reference to FIGS. 1, 5-7 where it can be seen that the groove is a right triangle in lateral cross section, defining a shoulder 36 extending into the body of the pin member 10 at an angle somewhat less than ninety degrees relative to the tapered surface 32.

The base portion of the pin member 14 is broken by an elongate, longitudinally-oriented slot 34 in the outer surface of the base portion for a purpose discussed hereinafter.

Figure 2:
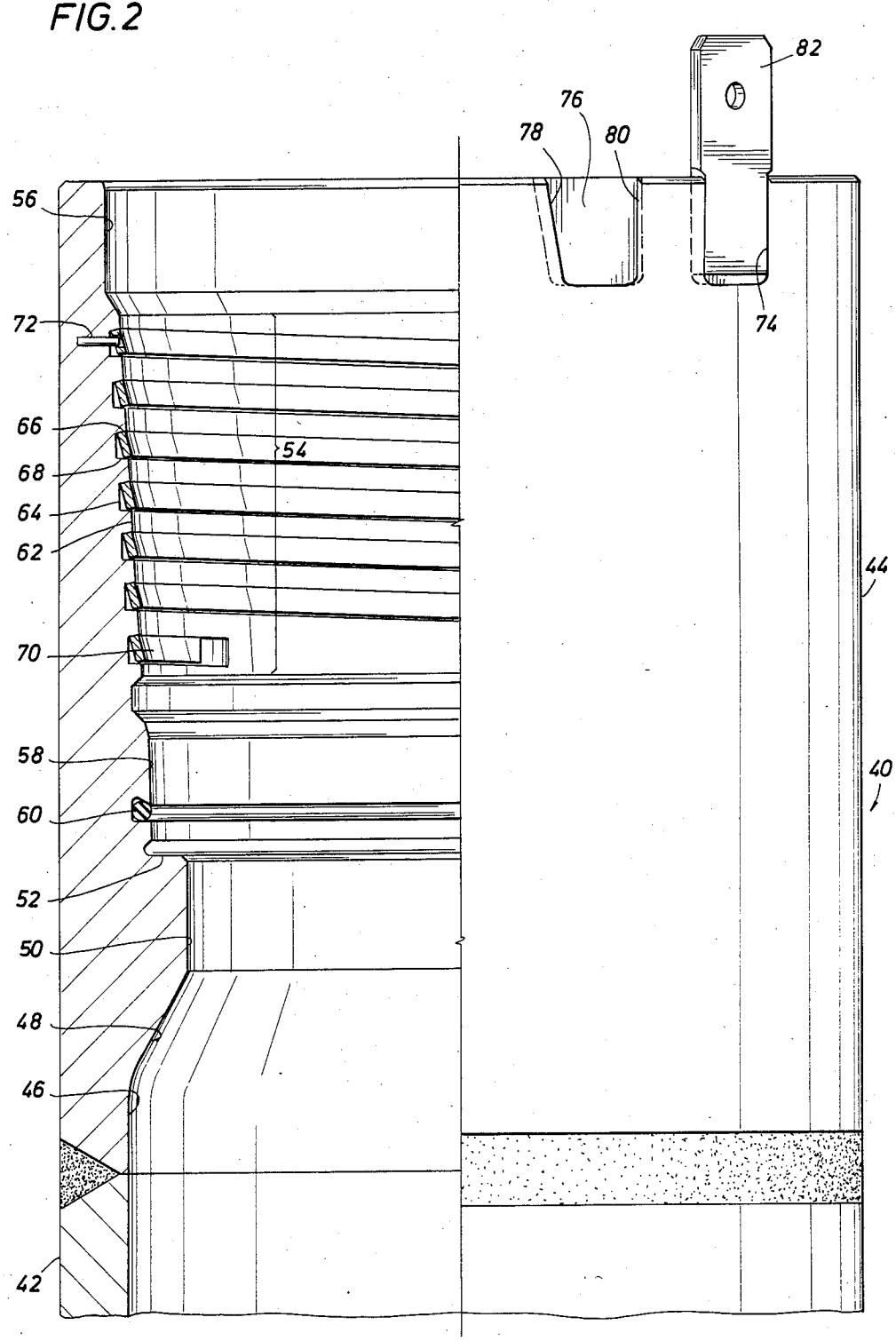
FIG. 2 is a longitudinal quarter section of a box connector according to the present invention, generally complementary to the pin connector of FIG. 1, and carrying a helical latch coil in the box connector groove.

A box connector member according to the present invention is shown generally at 40 in FIG. 2, welded to one end of a tubular member 42. The box connector 40 provides a generally tubular housing 44 which may feature a generally cylindrical exterior. The internal passage of the tubular member 42 continues in the box connector 40 along a generally cylindrical passage section 46 which may be of the same transverse cross section as the passage of the tubular member 42. A frustoconical shoulder 48 narrows the passage through the box connector 40 to a cylindrical passage section 50 of lesser transverse diameter than the passage section 46. An annular shoulder 52 generally marks the opposite end of the passage section 50. Beyond the shoulder 52 lies an internal collar section 54 defining a recess surrounded by the collar section. Between the collar section 54 and the open end of the box connector 40 is a receptacle, or recess, 56. The surface defining the receptacle 56 also serves as a seating surface, as discussed hereinafter.

Between the annular shoulder 52 and the collar section 54 is a second receptacle, or recess, 58, slightly tapered and broken by an annular groove carrying an O-ring seal 60 to engage a seating surface on a pin connector as discussed hereinafter. As illustrated, the collar section 54 is generally tapered, and the second receptacle 58 in the vicinity of one end of the collar section is of lesser transverse cross section than the first receptacle 56 in the vicinity of the opposite end of the collar section.

The collar section 54 includes an internal frustoconical surface 62 broken by a helical groove 64. Since the surface 62 is tapered, the helical groove 64 is also generally conical in shape. Details of the groove 64 may be appreciated by reference to FIGS. 2 and 5-7. One edge of the groove 64 provides a shoulder 66 which extends from the internal surface 62 at an angle somewhat less than ninety degrees. The opposite end of the groove cross section defines another shoulder 68 which may be perpendicular to the internal base of the groove, or very nearly so.

A helical latch coil 70 is carried in the box connector groove 64, and extends partly out of the groove in a relatively relaxed state of the coil. The coil 70, which has a generally rectangular cross section as may be appreciated by reference to FIGS. 2 and 5-7, is anchored to the housing 44 by a pin 72 in appropriate holes at one end of the coil and in the housing 44, as shown in FIG. 2. The opposite end of the coil 70 is preferably anchored to the housing 44 as well, and may be so anchored by a similar pin or other appropriate apparatus (not shown).

The exterior surface of the box connector housing 44 is broken by a pair of slots 74 and 76. The first slot 74 is generally rectangular and longitudinally-oriented along the housing 44. The second slot 76 has a slanted side 78 and a longitudinally-oriented side 80 to, in part, define a trapezoidal shape. A lock block 82 is shown positioned within the first slot 74 and extending beyond the end of the box connector 40 for a purpose discussed hereinafter. Details of the slots 74 and 76, and the block 82, may be further appreciated by reference to FIG. 17 wherein it is shown that the slots and the block are tapered laterally so that the block is held in the first slot 74 as in a dove-tail connection. Thus, the lock block 82 is simply inserted into or removed from the first slot 74 by longitudinal movement of the block relative to the box 40.

Figure 3:
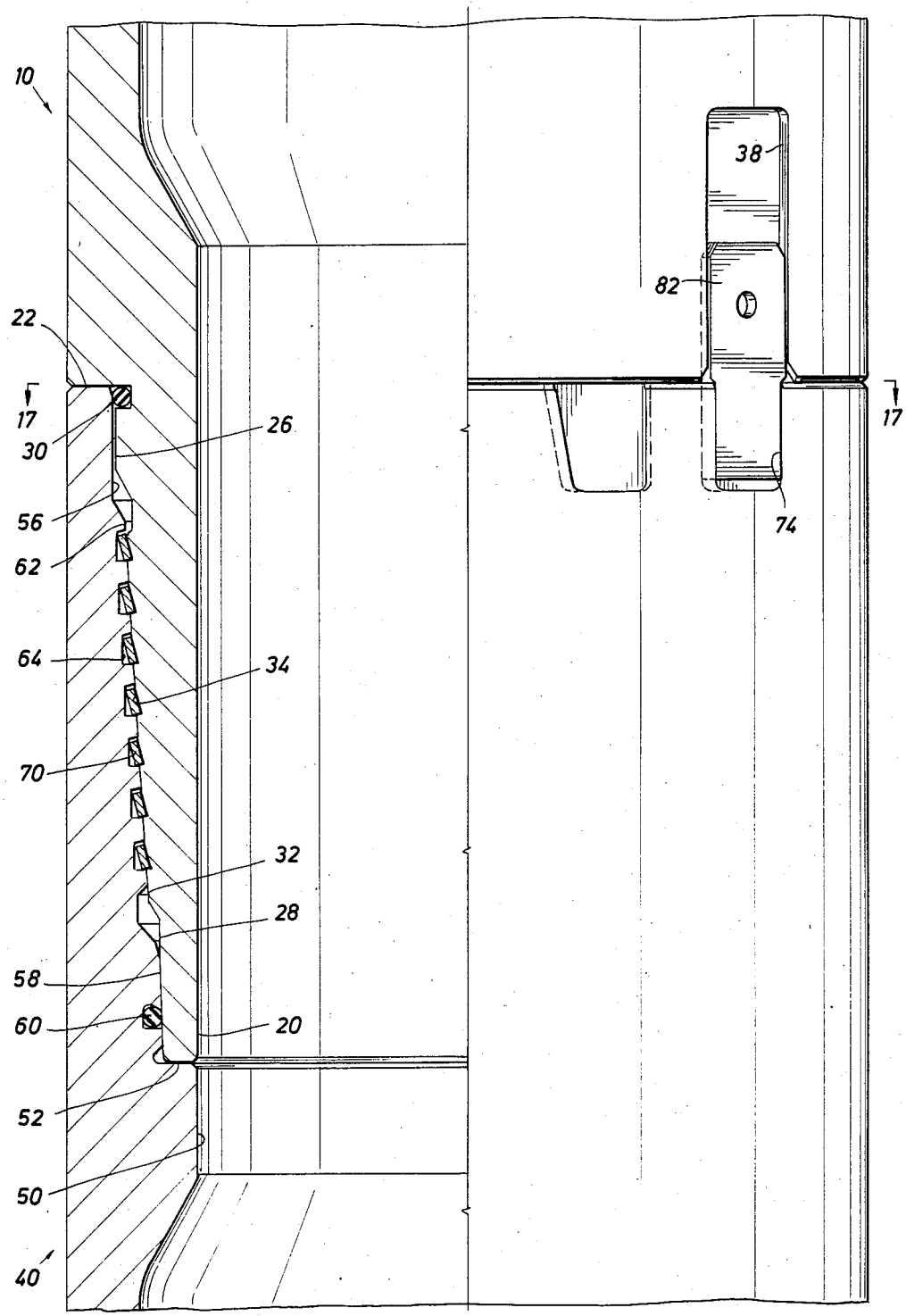
FIG. 3 is a quarter section of the pin and box connectors of FIGS. 1 and 2, respectively, joined together and mutually latched by the latch coil carried by the box connector.

In FIG. 3, the pin connector 10 of FIG. 1 is shown inserted within the box connector 40 of FIG. 2 and latched thereto by means of the latch coil 70. The operation of so connecting the pin and box members 10 and 40, respectively, and subsequently locking and releasing the connector members may be appreciated by reference to FIGS. 3, 4 and 5–7.

Figure 5:
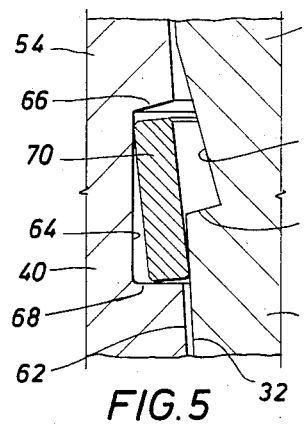
FIG. 5 is a fragment in cross section of the pin and box connectors of FIG. 3, illustrating the position of the latch coil driven into the groove of the box connector by the external surface of the pin connector.
Figure 16:
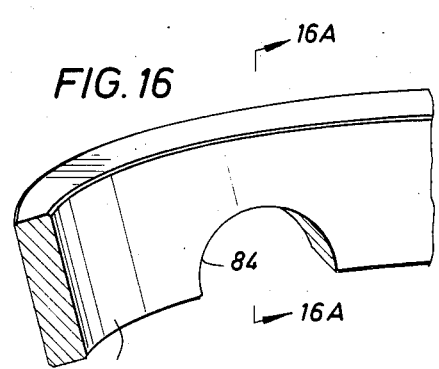
FIG. 16 is a view similar to FIG. 15, but illustrating a recess, or profile, along the bottom portion of the helical latch coil, as illustrated, carried by the box connector of FIGS. 2–7 to facilitate distortion of the coil by the pin connector surface.
Figure 16A:
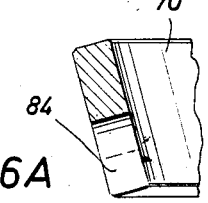
FIG. 16A is a transverse cross section taken along line 16A—16A of FIG. 16 to further illustrate the structure of the profile of the latch coil.

The external tapered surface 32 of the pin member 10 is generally complementary to the internal tapered surface 62 of the box member 40, and the pin member helical groove 34 has the same pitch as the box member helical groove 64. As the pin member 10 is advanced within the interior of the box member 40, eventually the condition is achieved wherein the external pin surface 32 contacts the latch coil 70 and forces the latter into the box groove 64, as illustrated in FIG. 5. The box groove 64 is so structured, defining the shoulder 68, to receive the latch coil 70 in this operation. It will be appreciated that the latch coil 70 is elastically distorted, or flexed, into the groove 64. To facilitate such flexing, the bottom edge of the latch coil 70 is broken by one or more recesses, or profiles, such as indicated by 84 in FIGS. 16 and 16A. An array of such profiles, spaced along the bottom edge of the latch coil 70, allows the latch coil to turn radially outwardly into the box groove 64, simulating stretching of the bottom edge of the coil, while permitting the coil to retain its elasticity. With the internal and external surfaces 32 and 62, respectively, of the two connectors tapered as illustrated, it will be appreciated that the pin surface 32 so contacts the latch coil 70 and flexes it radially outwardly into the box groove 64 generally simultaneously along the length of the latch coil. It will be further appreciated that, if the external pin surface 32 and the internal box surface 64 are cylindrical, or generally so, the pin surface 32 would continually flex an ever increasing amount, or length, of the latch coil 70 into the box groove as the pin would be advanced into the box until the entire length of the coil may be so flexed into the box groove.

When the pin 10 has been inserted into the box 40 to the full extent possible, one or the other or both shoulders, 22 of the pin 10 and 52 of the box 40, will abut the end surface of the other of the two connector members, prohibiting further advancement of the pin into the box. The shoulders 22 and 52 thus provide landing surfaces to carry a portion of the weight of the tubular string, and to receive and/or transmit forces directed longitudinally along the tubing string as the tubing string is driven into the ground, for example.

Figure 6:
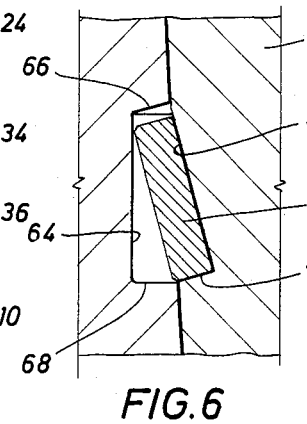
FIG. 6 is a view similar to FIG. 5, but showing the pin and box connectors mutually advanced to be latched by the latch coil extending into the grooves of both connectors as in FIG. 3.

In the fully-inserted configuration of FIG. 3, the helical grooves 34 and 64 are generally mutually aligned to achieve the configuration illustrated in FIG. 6. As shown in FIG. 6, with the pin 10 fully inserted within the box 40, the pin groove 34 is mutually aligned with the box groove 64 so that the lower pin groove shoulder 36 clears the bottom edge of the latch coil 70, allowing the latch coil to flex radially inwardly into the pin groove as illustrated. To achieve this configuration, it will be appreciated that the pin 10 is appropriately rotationally aligned with the box 40. Such mutual rotational alignment between the connector members 10 and 40 is secured by receiving the protruding extension of the lock block 82 in the slot 38 of the pin member 10.

The slots 74 and 38 of the box 40 and pin 10, respectively, are so positioned to coincide, upon mutual alignment, with the alignment between the groove 34 and 64 illustrated in FIGS. 3 and 6 when the pin 10 is fully inserted into the box 40.

The two connector members 10 and 40 are latched together in this configuration of FIGS. 3 and 6, since longitudinal movement of the pin 10 outwardly from the box 40 would be prohibited by contact of the upper edge of the latch coil 70 with the box groove shoulder 66. Consequently, without mutual rotation between the pin 10 and box 40, these two connector members are latched together by the extension of the latch coil 70 into the box groove 64 as well as the pin groove 34. Also in the latched configuration illustrated, the pin O-ring seal 30 sealingly engages the internal surface of the receptacle 56 of the box 40, and the box O-ring seal 60 sealingly engages the external guide surface 28 of the pin. The limited longitudinal movement of the pin relative to the box 40 that might be permitted by the modest spacing exhibited between the box groove shoulder 66 and the top edge of the latch coil 70 as illustrated in FIG. 6 would not be sufficient to permit breaking of the sealing contacts between the O-rings 30 and 60 and the corresponding seating surfaces 56 and 28, respectively. Consequently, the latched configuration of the connector assembly as illustrated in FIG. 3 is sufficient for many purposes for which the tubing string may be assembled, including the driving of such a tubing string into the ground, for example. The latched configuration thus provides a connector assembly which continues the internal passage from one tubing string member to the next, and provides desired sealing integrity and structural strength.

During the process of insertion of the pin connector 10 into the box connector 40, proper alignment of the two connectors about their respective longitudinal axes, for example, prior to the ratcheting of the latch coil 70 by the external pin surface 32 is insured by receipt of the pin guide surfaces 26 and 28 by the box receptacles 56 and 58, respectively. The operation of guide surfaces and receptacles ensuring proper alignment of threaded connector members to avoid cross-threading is discussed, for example, in U.S. Pat. No. 4,410,204 which is incorporated herein by reference. Thus the pin 10 and box 40 are aligned longitudinally by means of the guide surfaces 16 and 28 being received within the receptacles 56 and 58, respectively, and the connector members are rotationally aligned by means of the pin slot 38 being aligned to receive the lock block 82 being carried by the box slot 74.

In general, either or both of the guide surfaces 26 and 28 and the corresponding receptacle surfaces 56 and 58, respectively, may be cylindrical or tapered. Further, the guide surfaces may be of the same or different diameters, whether or not the grooved surfaces of the connector members are tapered, with generally complementary receptacles.

Figure 4:
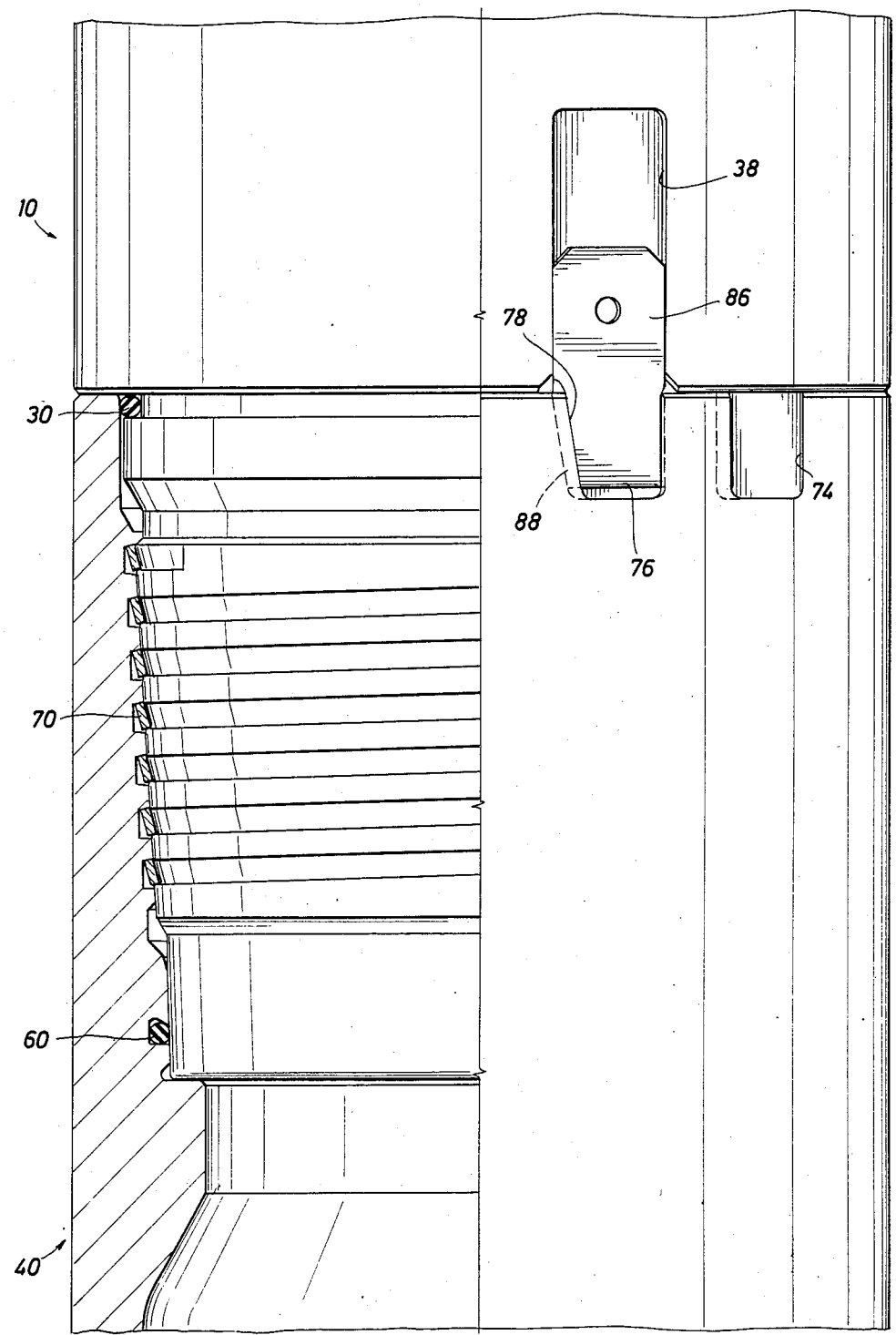
FIG. 4 is a view similar to FIG. 3, but showing the connectors rotated to the locked configuration.
Figure 7:
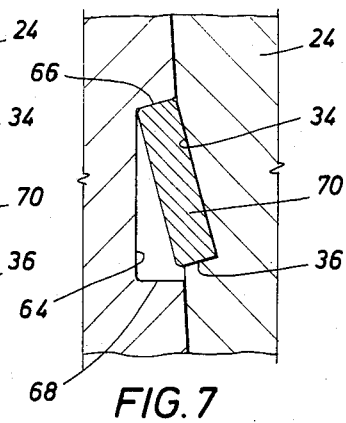
FIG. 7 is a view similar to FIGS. 5 and 6, but showing the latch coil tightened, or locked, between the grooves of the pin and box connectors by mutual rotation between the connectors as in FIG. 4.

The lock block 82 may be removed from the pin slot 38 as well as the box slot 74 to permit rotation between the connectors 10 and 40. The length of the pin slot 38 is sufficient to allow lifting of the lock block 82 out of the dove-tail box slot 74. With the lock block 82 removed from the slots 38 and 74, the pin box connectors 10 and 40, respectively, may be mutually rotated in the forward direction, or righthand sense, without mutual longitudinal movement to tighten, or lock, the latch connection between the two members. As the forward rotation occurs, the pin groove 34 is advanced relative to the latch coil 70 so that the groove shoulder 36 is drawn upwardly against the latch coil, driving the latch coil longitudinally upwardly until the top of the latch coil abuts the box groove shoulder 66, as shown in FIGS. 4 and 7. It will be appreciated that, with the pin 10 fully inserted within the box 40, and the latch coil 70 sandwiched between the pin groove shoulder 36 and the box groove shoulder 66 (the shoulders 36 and 66 may be mutually parallel as illustrated), no mutual longitudinal movement between the pin and box members is permitted. This locked and tightened latched configuration may be achieved, for example, by rotating the two connector members 10 and 40 a short distance from the latched configuration of FIG. 3, typically about fifteen degrees. The second box slot 76 is positioned to generally align with the pin slot 38 in the locked and tightened configuration, as illustrated in FIG. 4. A second lock block 86, with a dove-tail bottom portion featuring a tapered edge 88, may be inserted into the pin slot 38 and lowered behind the dove-tail edges of the second box slot 76 to lock the pin 10 and box 40 against mutual rotation. Thus, in the tightened and locked configuration of FIG. 4, the two connector members 10 and 40 are rigidly locked together. It will be appreciated that the sealing integrity between the two connector members 10 and 40, provided by the O-ring seals 30 and 60, is maintained in the rigid configuration of FIG. 4 and during rotation to that configuration from the configuration of FIG. 3. The second lock block 86 may be removed from the slots 76 and 38 to back rotate the connector members 10 and 40 to the latched configuration of FIG. 3 or to a release configuration for separation of the two connectors.

The connector member grooves 34 and 64 and the helical latch coil 70 are illustrated in FIGS. 1 and 2 as forming righthand helixes, which would be the shapes of righthand threads. Consequently, "back rotation" identifies mutual rotation between the pin 10 and box 40 in the same sense that those members would be mutually rotated to unthread righthand threads. "Forward rotation" between the pin 10 and box 40 illustrated in FIGS. 1-3 would be rotation which would tend to advance meshed righthand threads.

The connector member slots 38, 74 and 76 may be utilized in the rotation effected between the connector members 10 and 40 to tighten the connection therebetween as well as to release that connection by anchoring one or more torque tools, operable by hydraulic pressure, for example, in one or more of the slots to provide the force necessary to effect the turning desired.

It will also be appreciated that the connector member grooves 34 and 64, as well as the latch coil 70, may be constructed in the manner of lefthand turn helixes. In that case, the circumferential positions of the first and second slots 74 and 76, respectively, as well as the relative positions of the straight and slanted edges 80 and 78, respectively, of the second box slot, would be reversed. One box slot would nevertheless be positioned to align with the pin slot to effect the proper rotational orientation between the pin and box connectors to achieve the latching configuration described above, and illustrated in FIGS. 3 and 6, and a second box slot would be positioned to achieve the rigid locking of the connectors in the locked and tightened configuration of FIGS. 4 and 7.

Figure 8:
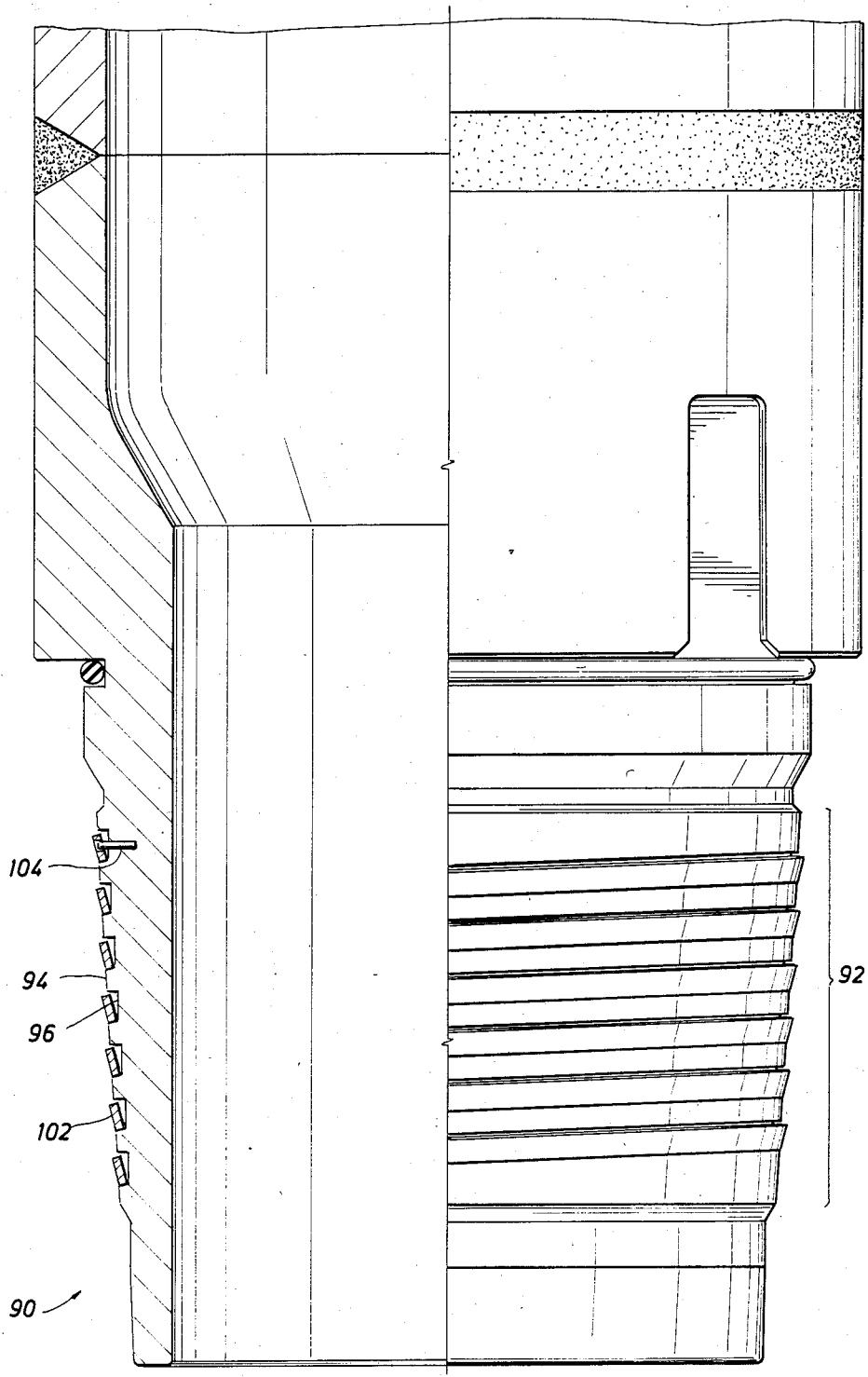
FIG. 8 is a quarter section of a pin connector according to the present invention, carrying a helical latch coil in the pin connector groove.

Another version of a pin connector member according to the present invention is shown generally at 90 in FIG. 8. The pin 90 is generally the same as pin 10 with the exception that pin 90 features a neck 92 which is different from the neck 24 of pin 10. All other structural and functional features of pin 90 are also found in pin 10 as may be appreciated by reference to FIGS. 1 and 8, and will not be further discussed herein in detail. The neck portion 92 includes an external frustoconical surface 94 similar to the neck portion surface 32 of pin 10, but broken by a helical groove 96, generally conic in structure, whose details may be more fully appreciated by reference to FIGS. 12-14. In transverse cross section, the pin groove 96 has an upper end in cross section defining a shoulder 98 which may be perpendicular to the internal side of the groove, or very nearly so. The opposite end of the groove cross section provides a shoulder 100 which extends from the external pin surface 94 at an angle somewhat less than ninety degrees.

A helical latch coil 102 is carried in the pin connector groove 96, and extends partly out of the groove in a relatively relaxed state of the coil. The coil 102, which has a generally rectangular cross section as may be appreciated by reference to FIGS. 8 and 12-14, is anchored to the pin connector 90 by a pin 104 at one end of the coil, as shown in FIG. 8. The opposite end of the coil 102 is preferably anchored to the pin connector 90 as well, and may be so anchored by a similar pin or other appropriate apparatus (not shown).

Figure 9:
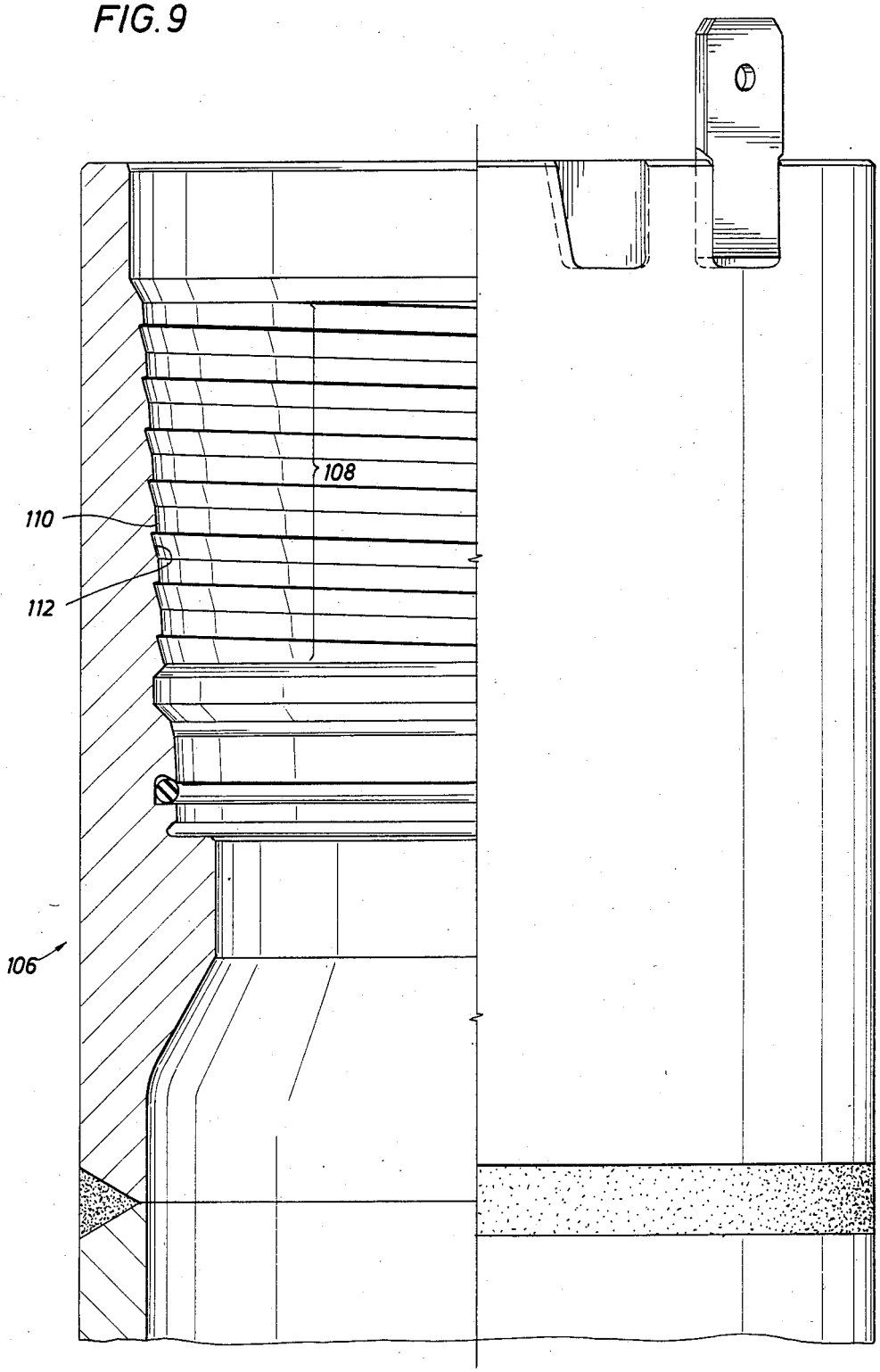
FIG. 9 is a quarter section of a box connector according to the present invention, generally complementary to the pin connector of FIG. 8.

Another version of a box connector member according to the present invention is shown generally at 106 in FIG. 9. The box connector 106 is generally the same as the box connector 40 illustrated in FIG. 2, with the exception that an internal collar portion 108 of the box connector 106 differs from the internal collar portion 54 of the box connector 40. Otherwise, as reference to FIGS. 2 and 9 shows, the box connector 106 is generally the same in structure and function as the box connector 40, and will not be discussed hereinafter in further detail.

The collar section 108 is generally tapered, and includes an internal frustoconical surface 110 broken by a helical groove 112, which is also conical in general structure. Details of the groove 112 may be appreciated by reference to FIGS. 12-14, wherein it is shown that the groove 112 is a right triangle in transverse cross section, defining a shoulder 114 extending into the box member 106 at an angle somewhat less than ninety degrees relative to the tapered surface 110.

Figure 12:
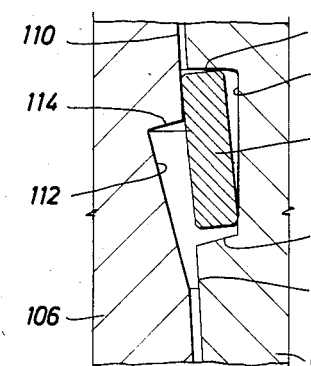
FIG. 12 is a view similar to FIG. 5, but taken of the pin and box connectors of FIGS. 10 and 11, showing the position of the latch coil driven into the groove of the pin connector by the internal surface of the box connector.
Figure 13:
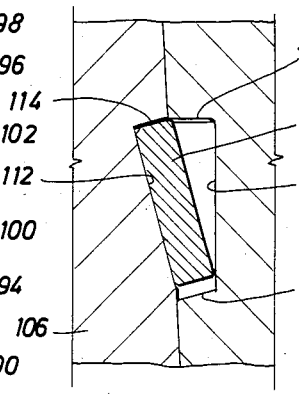
FIG. 13 is a view similar to FIG. 12, but showing the pin and box connectors mutually advanced to be latched by the latch coil extending into the grooves of both connectors, as in FIG. 10.
Figure 14:
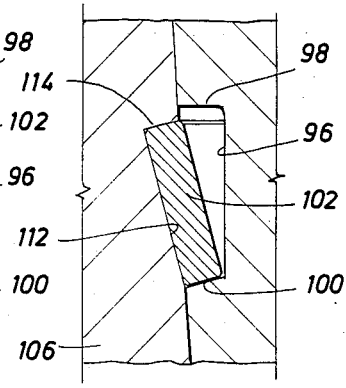
FIG. 14 is a view similar to FIGS. 12 and 13, but showing the latch coil tightened, or locked, between the grooves of the pin and box connectors by mutual rotation between the connectors, as in FIG. 11.

A comparison of FIGS. 5-7 with FIGS. 12-14, respectively, reveals that the overall cross sections of the two latch coils 70 and 102 are basically the same, the latch coil-carrying pin groove 96 of the pin member 90 is generally the same in cross section, but inverted and reversed, compared to that of the latch coil-carrying groove 64 of the box member 40, and the box groove 112 is generally the same in cross section, but inverted and reversed, compared to the pin groove 34. Further, the operation and function of the respective coils and latch grooves of the two versions of the connector assemblies is basically the same, but, in the matter of the latch coil in particular, is generally inverted and reversed.

Figure 15:
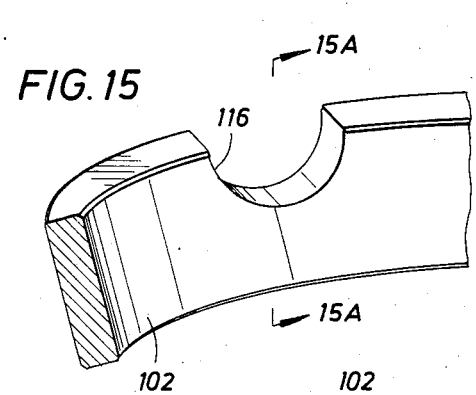
FIG. 15 is a fragmentary view, in perspective, of the helical latch coil carried by the pin connector of FIGS. 8 and 10–14, and illustrating a recess, or profile, along the top portion of the coil as illustrated to facilitate distortion of the coil by the box connector surface.
Figure 15A:
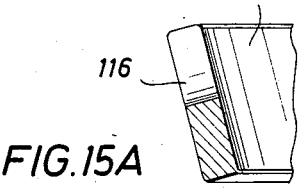
FIG. 15A is a transverse cross section taken along line 15A—15A of FIG. 15 to further illustrate the structure of the profile of the latch coil.

The pin connector member 90 may be latched to the box connector member 106 by means of the latch coil 102 as follows. It will be appreciated by reference to FIG. 8 that the latch coil 102 is carried by the pin 90 partly extending radially outwardly from the pin groove 96. The frustoconical pin surface 94 is generally complementary to the frustoconical internal box surface 110. As the pin 90 is inserted into the box 106, eventually the box surface 110 contacts the latch coil 102 generally throughout the length of the coil at virtually the same time and, as the pin is further inserted into the box, the box surface 110 drives the latch coil 102 into the pin groove 96. Such motion by the latch coil 102 is generally a distortion of the latch coil, the upper edge thereof being flexed radially inwardly into the pin groove 96. To facilitate such flexing, the upper edge of the latch coil 102 is broken by one or more recesses, or profiles, 116 spaced along the upper edge of the coil, as indicated in FIGS. 15 and 15A. The recesses 116 thus allow the latch coil 102 to flex as described, simulating shortening of the upper edge of the coil.

Figure 10:
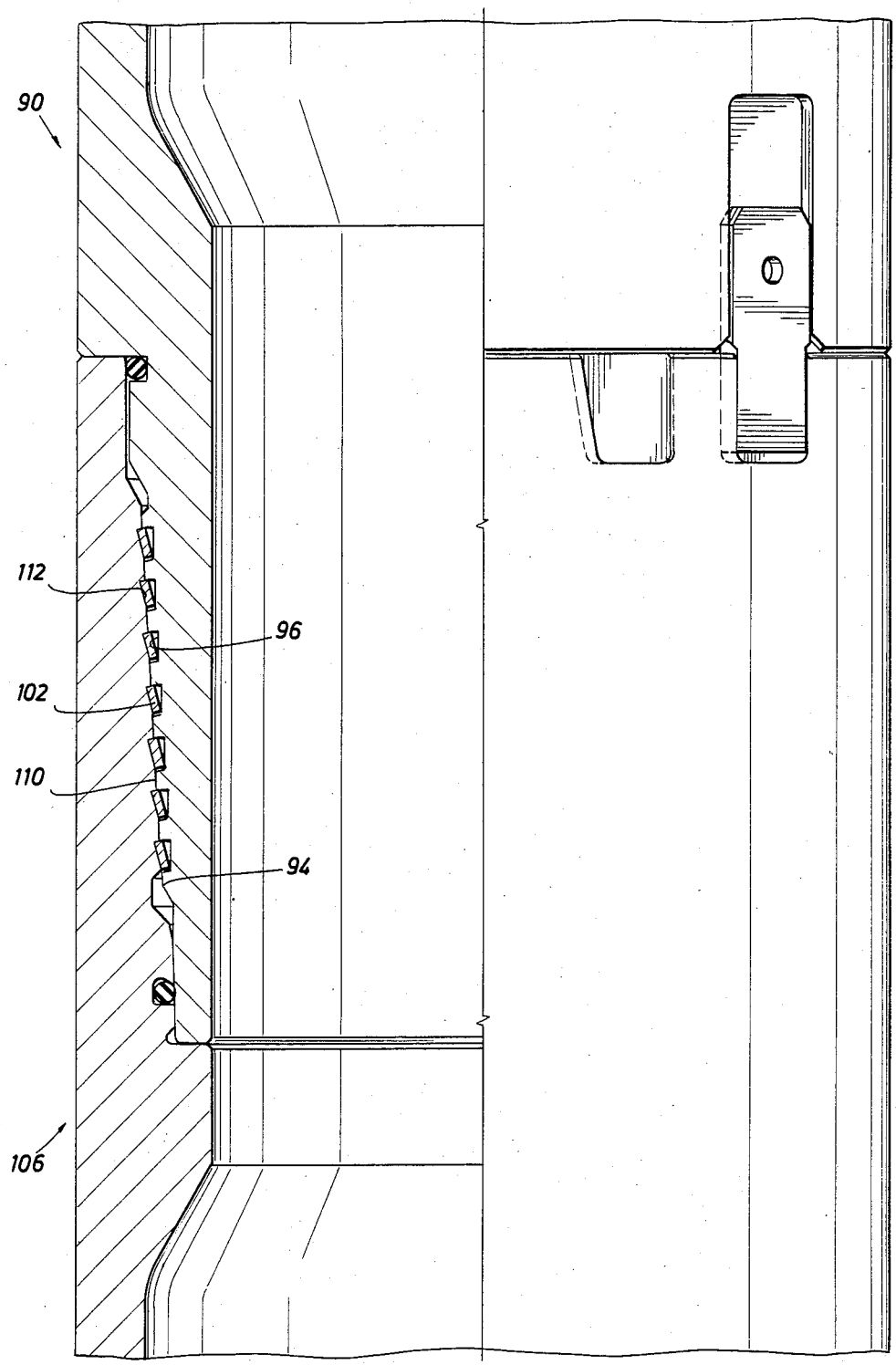
FIG. 10 is a quarter section of the pin and box connectors of FIGS. 8 and 9, respectively, joined together and mutually latched by the latch coil carried by the pin connector.

As in the case of the pin 10 and connector 40, the pin 90 and connector 106 may feature cylindrical, complementary grooved surfaces with a latch coil that is in the general shape of a cylindrical helix, wherein the latch coil would be continuously flexed radially inwardly, in part, as the pin is advanced into the box. In either event, when the pin member 90 is advanced completely into the box 106 as shown in FIG. 10, wherein the connector members are mutually sealed and with at least one of the respective ends abutting a landing surface as discussed hereinbefore in reference to FIG. 3, the pin groove 96 is generally aligned with the box groove 112, the two grooves being of the same pitch, so that the upper edge of the latch coil 102 clears the box shoulder 114 and the latch coil may relax radially outwardly to the configuration illustrated in FIGS. 10 and 13, extending into both the pin groove 96 and the box groove 112. In this latched configuration, the pin 90 and box 106 may be moved mutually longitudinally a short distance, limited by the pin groove shoulder 100 contacting the latch coil 102, but such movement would not permit the breaking of the fluid seals between the pin and box connectors. It will be appreciated that the latched configuration of FIG. 10 is achieved by rotationally orienting the pin 90 and box 106, as well as longitudinally orienting the two connector members in the same fashion as discussed in connection with the orientation of the pin 10 with the box 40 to achieve the latched configuration of FIG. 3.

Figure 11:
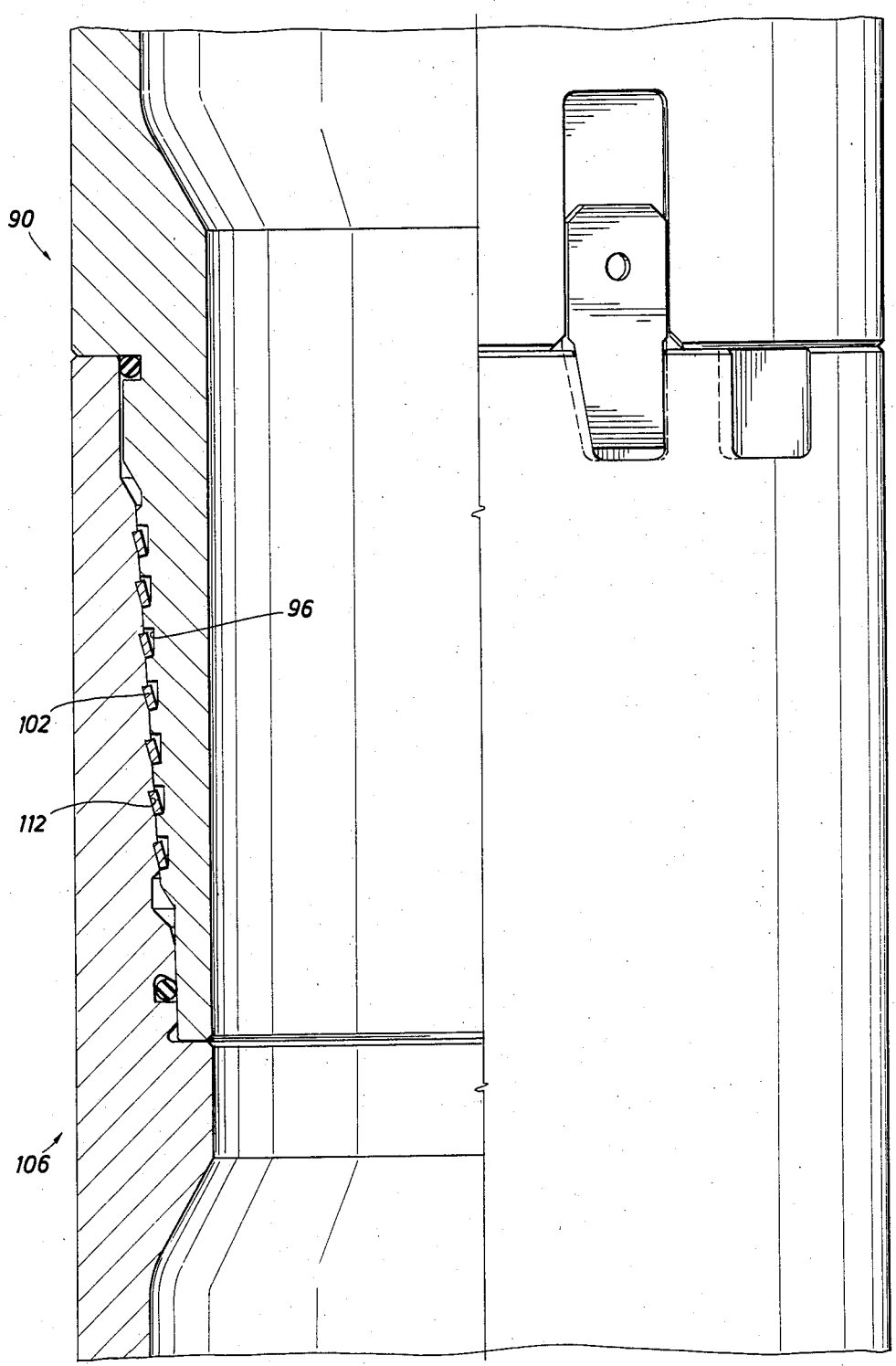
FIG. 11 is a view similar to FIG. 10, but showing the connectors rotated to the locked configuration.

From the first latch configuration of FIG. 10, pin 90 and box 106 can be mutually back rotated to effectively turn the latch coil 102, carried by the pin member, relative to the box connector so that the latch coil in its extended configuration of FIG. 13 moves out of the box groove 112, clearing the box shoulder 114 so that the pin may be completely withdrawn from the box. The pin 10 and box 106 may also be forwardly rotated to draw the pin shoulder 100 against the bottom edge of the latch coil 102, as shown in FIGS. 11 and 14, wherein the latch coil is tightened and locked between the pin shoulder 100 and the box shoulder 114. In the locked configuration of FIGS. 11 and 14, no longitudinal movement is permitted between the pin 90 and box 106. The connector members 90 and 106 may be fixed in this locked configuration by use of a lock block as illustrated in FIG. 11, and as described hereinbefore in reference to FIG. 4, for example.

Figure 18:
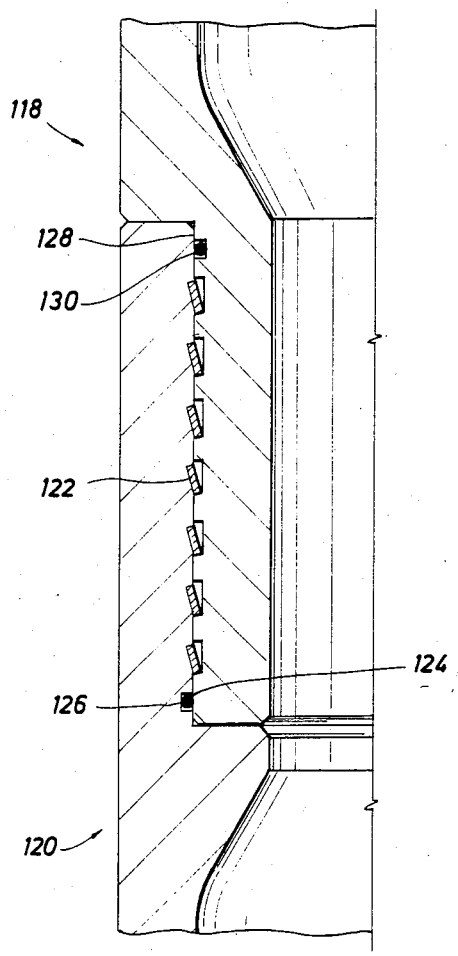
FIG. 18 is a fragment of a longitudinal section of a box and pin connector assembly according to the present invention, in the locked configuration, but with no guide surfaces nor receptacles for receipt thereof.

Yet another variation of a connector assembly according to the present invention is illustrated in FIG. 18, wherein a pin member 118 is connected to a box member 120 by means of a latch coil 122 (illustrated as carried by the pin member). However, the pin member 118 features an external cylindrical surface 124 broken by a helical groove carrying the cylindrical helix coil that generally continues throughout the shank of the pin member, and engages and O-ring seal 126 carried by the box member 120, while the box member features an internal cylindrical surface 128 broken by a helical groove and extending generally throughout the length of the collar portion of the member 120, and engages an O-ring seal 130 carried by the pin member 118. No separate, distinguishable guide surfaces and receptacles are included in the pin member 118 and box member 120, respectively, as in the cases of the connector members illustrated in FIGS. 1-4 and 8-11. However, it will be appreciated that since the pin 118 is joined to the box 120 merely by stabbing the former into the latter to at least achieve a latched configuration as discussed above, there is no danger of "cross-threading" or the like, the latch coil 122 operating generally as a snap ring in this regard.

Figure 24:
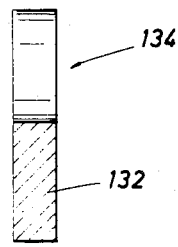
FIG. 24 is a transverse cross section taken along line 24—24 of FIG. 23 and further illustrating the structure of the profile of the latch coil.
Figure 23:
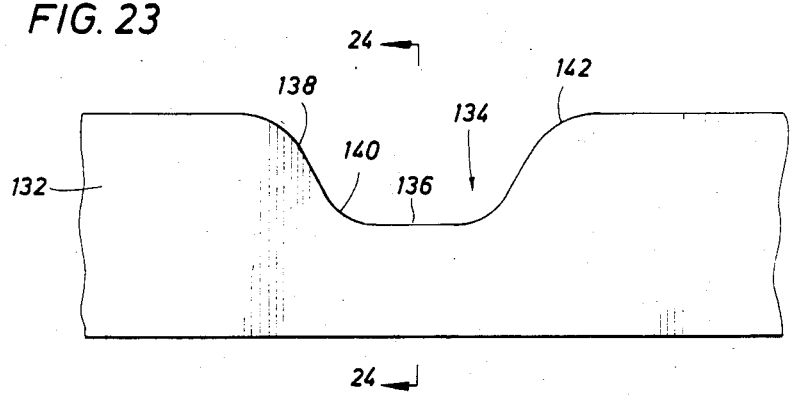
FIG. 23 is a fragmentary elevation of a latch coil showing another version of a recess, or profile, to facilitate distortion of the coil, it being understood that the recess or profile thus illustrated may be appropriately positioned on the top or bottom of the coil.

FIGS. 23 and 24 illustrate another version of a latch coil 132, featuring recesses, or profiles, shown generally at 134 for the purpose of facilitating flexing, either to simulate extension or contraction of the flexing edge. The profile 134 may thus be provided on the bottom edge of a latch coil 132 carried by a box connector, or along the top edge of a latch coil carried by a pin member. The specific structure of the profile 134 includes a relatively flat base surface, or edge, 136 separated from two relatively flat side surfaces 138 by arcuate curved surfaces 140, while the side surfaces 138 are separated from the outer edge of the latch coil by arcuate curved surfaces 142. The base surface 136 may be parallel to the outer edges of the latch coil 132. It will be appreciated that other shapes for recesses or profiles may be provided to break the edges of the latch coils to faciltate flexing, either to simulate extension of the coil edge in a radially outwardly flex, or contraction of the coil edge in a radially inward flex.

In FIGS. 25 and 26, a latch coil 144 is shown carried by a box connector 146 in a helical, conic groove 148. The coil and groove are provided in lefthand turned helixes, for connection to a pin member (not shown) featuring an external groove in a conic, lefthand helix. The internal surface of the box connector 146 is also broken by an arcuate slot, or groove, 150 positioned generally parallel to the longitudinal axis of the box connector and traversing at least one turn of the groove 148. Such a groove may be established by means of a cutting tool, for example, positioned within the box connector for that purpose.

The end of the latch coil 144 features an inwardly-turned tab 152 which is positioned, or caught, within the slot 150. It will be appreciated that the latch coil 144 is held within the groove 148 by the extension of the latch coil into the groove, as discussed hereinbefore in the matter of the latch coils 70 and 102, for example. The tab 152 residing in the groove 150 locks the latch coil 144 from rotational movement along the groove 148. A similar tab at the opposite extremity of the latch coil residing in a groove similar to 150 (neither shown) locks the opposite end of the latch coil from movement along the groove 148. With both ends of the latch coil 144 thus anchored, any tendency of the latch coil to ride along the groove 148 and be flexed radially inwardly out of the groove 148 other than to snap into a pin groove is thus prevented.

FIGS. 27-29 illustrate a latch coil 154 carried by a pin member 156 in an appropriate helical groove 158. In this instance, the groove 158 and coil 154 are provided as righthand turn helixes. The external surface of the pin member 156 is also broken by a slot 160 traversing the groove 158 and receiving therein an inwardly-turned tab 162 at the end of the latch coil 154. The slot 160 may be provided by use of a milling or other cutting tool, for example. Engagement of the coil tab 162 in the slot 160, combined with the fact that the coil 154 resides in the groove 158, locks the coil against movement along the groove. A similar locking of the opposite end of the coil 154 by means of a tab-in-slot arrangement (not shown) completes the anchoring of the coil to the pin member 156.

It will be appreciated that any appropriate technique may be utilized to anchor a latch coil to a pin or box connector according to the present invention.

Figure 22:
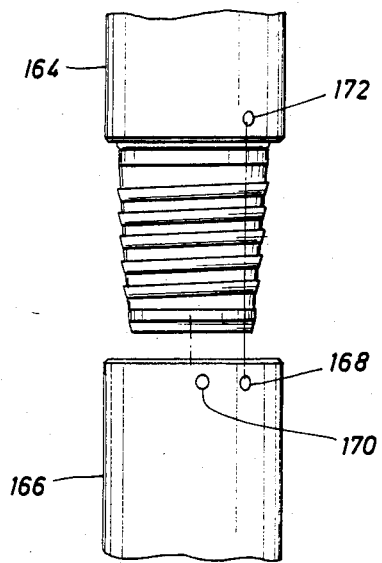
FIG. 22 is a fragmentary elevation of a pin and box connector according to the present invention, with the two connectors mutually aligned for insertion of the pin connector into the box connector, and featuring fiducial insignia for rotationally orienting the two members.

Various techniques may be utilized to facilitate the mutual rotational alignment between connector members to achieve the latched configuration, in addition to those techniques discussed hereinbefore and illustrated in FIGS. 1-4 and 8-11. Any technique which permits the user to readily achieve the preferred alignment may be so utilized. For example, FIG. 22 illustrates a pin connector member 164 positioned for insertion within the end of a box connector 166, both according to the present invention. The box connector 166 includes first and second marks 168 and 170, respectively, and the pin connector 164 includes a mark 172. Aligning the pin marking 172 with the first box marking 168 will achieve the latched configuration illustrated in FIGS. 3 and 10, for example, when the pin connector 174 is inserted into the box connector 166. With a righthand turned latch coil, mutual rotation between the two connectors 164 and 166 to align the pin marking 172 with the second box marking 170 will generally bring the connection to the tightened configuration illustrated in FIGS. 4 and 11, for example. It will be appreciated from the previous discussion herein that the latched configuration may be achieved upon insertion of the pin connector 164 into the box connector 166, for example, if the pin marking 172 is aligned over the circumferential range beginning at the first box marking 168 and extending toward the second box marking 170. The closer the pin mark 172 is aligned with the second box mark 170 the "tighter" the latch coil will be positioned upon landing within the groove of the member not carrying the latch coil. This feature is true and applicable in general to connector assemblies according to the present invention.

Another version of a connector assembly according to the present invention is illustrated in FIG. 19 wherein a pin connector member 174 is aligned with a box connector member 176 for mutual coupling. The connector members 174 and 176 include all of the essential features, or versions thereof, of the present invention illustrated in FIGS. 1 and 2, for example, with the additional features that the present connector members are particularly adaptable for use with flexible tubular members. Thus, the pin member includes a neck portion 178 featuring external ribs 180 for securing a tight, sealed fit with a tubular member 182, such as a hose or elastomeric tubing. A clamp 184 may be tightened about the tubing 182 to complete the connection of the tubing to the pin connector 174. A generally cylindrical base portion 186 of the pin member 174 is knurled for ease of handling. The end of the base portion 186 opposite the neck 178 features an annular shoulder 188 against which the open end of the box connector 176 may abut. An O-ring seal 190 resides in an appropriate groove adjacent the shoulder 188 for sealing with the box connector. First and second guide surfaces 192 and 194, respectively, generally flank a tapered neck portion 196, the latter being broken by a helical groove 198 featuring a cross section generally of the same shape as illustrated in FIGS. 5-7 for the pin groove 34. An elongate tab 200 extends longitudinally from the base portion 186 and overlies a portion of the first guide surface 192.

The box connector 176 also features a neck 202 with external ribs 204 to secure a tight, sealed fit with a tubing member 206, which fit may be anchored by a clamp 208. A generally cylindrical housing 210 of the connector 176 also features a knurled portion to facilitate handling. The interior of the box connector 176 includes first and second receptacles 212 and 214, respectively, flanking an internal collar portion 215. The second receptacle 214 is broken by an annular groove within which resides an O-ring seal 216 for sealing to a pin connector. An annular shoulder 218 marks one end of the receptacle 214 against which the received pin connector may abut. The collar portion 215 is generally tapered and is broken by a helical groove 220 whose cross section may be generally the same as that of the box groove 64 illustrated in FIGS. 5-7. A latch coil 222 is carried in the groove 220, and may be anchored therein by pins or tabs as described hereinbefore, or by any other appropriate device. The shape of the cross section of the latch coil 222 may be generally that of the latch coil 70 illustrated in FIGS. 5-7. The edge of the latch coil 222 generally toward the tubular member 206 may be broken by recesses or profiles to facilitate flexing of the latch coil by a pin member as described above. The exterior of the housing 210 is broken by first and second elongate slots 224 and 226, respectively. The box member slots 224 and 226 may be used in cooperation with the pin member tab 200 to align the connector members 174 and 176 for achieving a latched connection, and thereafter a locked and tightened connection.

In FIG. 20, the pin connector member 174 is fully inserted within the box connector member 176 and latched therein by the latch coil 222 residing in both the box groove 220, in which the coil is carried, and the pin groove 198 in much the same manner as illustrated in FIGS. 3 and 6. Similarly, the O-ring seals 190 and 216 are in sealing engagement with seating surfaces as illustrated. The rotational alignment between the pin 174 and box 176 is assured by the pin tab 200 being received within the first box slot 224. In FIG. 21, the pin connector 174 and box connector 176 have been advanced rotationally to the locked configuration, with the latch coil 222 locked in the grooves 198 and 220 in much the same manner as illustrated in FIGS. 4 and 7. The pin tab 200 has sufficient flexibility to be lifted radially outwardly out of the first box slot 224 to allow such rotation from the first latched configuration of FIG. 20, to the locked configuration of FIG. 21, whereby the tab 200 may then be placed within the second box slot 226 as shown. Reverse rotation between the connector members 174 and 176, with appropriate lifting of the pin tab 200 away from the box slots, will release the latching connection between the connector members provided by the latch coil 222, in either the configuration of FIG. 20 or FIG. 21, thus permitting withdrawal of the pin connector from the box connector.

The tab 200 is carried by the pin connector 174 in FIGS. 19-21 and matching slots provided by the box connector 176 as opposed to the box connector being equipped with an extending tab to facilitate use of the connector assembly without unnecessary exposure of the tab to breakage or other damage. It will be appreciated that the tab-and-slot combinations may be provided on connector members according to the present invention in either order.

While the pin and box connectors 174 and 176 illustrated in FIGS. 19-21 and particularly adaptable for use with flexible tubular members utilize a latch coil 222 carried by the pin connector member, it will be appreciated that such connector members may be constructed whereby the latch coil is carried by the pin member as discussed hereinbefore in connection with other embodiments of the present invention.

The present invention thus provides a technique for connector members wherein a latched connection may be achieved without mutual rotation between the members, and wherein the latched connection may be tightened and/or locked by rotation between the members without further longitudinal mutual advancement. Back rotation may be effected to release the connected members from both the latched and locked configurations to permit complete disconnection therebetween.

The foregoing disclosure and description of the invention is illustrative and explanatory thereof, and various changes in the method steps as well as in the details of the illustrated apparatus may be made within the scope of the appended claims without departing from the spirit of the invention.

What is claimed is:

1. A connector assembly comprising:
   a. a first connector member featuring a recess defined, at least in part, by an internal surface surrounding said recess and including a helical groove;
   b. a second connector member, receivable within said recess of said first connector member, featuring an external surface circumscribing said second member and including a helical groove; and
   c. helical latch means carried by one of said internal or external surfaces in said helical groove thereof by extending at least partly into such groove, said latch means having a generally rectanglar cross section and being anchored at both ends;
   d. wherein:
      i. said internal and external surfaces are generally mutually complementary, and the corresponding grooves thereof are of the same pitch; and
      ii. as said second member is received within said first member, said latch means is rotationally flexed about its cross section in said groove of said member carrying said latch means by said surface of said other member, whereafter, with said helical grooves mutually aligned at least in part, said latch means may relax to extend partly out of said groove of said member carrying said latch means and partly into said groove of said other member to latch together said first and second connector members.

2. Apparatus as defined in claim 1 wherein:
   a. said internal and external surfaces are each generally tapered, and said corresponding grooves are generally conical; and
   b. said latch means is generally conical.

3. Apparatus as defined in claim 2 further comprising seal means carried by at least one of said first and second members for sealing engagement with the other of said members when said first member is so received within said recess of said second member and said latch means so extends into both said grooves carried by said corresponding surfaces of said first and second members to so latch said first and second members together.

4. Apparatus as defined in claim 2 wherein said latch means features at least one profiled edge to facilitate distortion of said latch means upon said latch means being driven into said groove of said member carrying said latch means.

5. Apparatus as defined in claim 2 further comprising:
   a. at least one internal receptacle surface as part of said first member; and
   b. at least one external guide surface as part of said second member, generally receivable by such receptacle surface of said first member when said second member is so received within said first member to urge said first and second members into mutual alignment.

6. Apparatus as defined in claim 2 wherein said first and second members, so latched together by said latch means, may be mutually rotated about the longitudinal axes of said internal and external surfaces to tighten said latch means in said groove of said other connector member not carrying said latch means.

7. Apparatus as defined in claim 2 further comprising rotational orientation means, carried by at least one of said first or second members, whereby said first and second members may be mutually rotationally oriented relative to the longitudinal axes of said internal and external surfaces for receipt of said second member by said first member.

8. Apparatus as defined in claim 2 further comprising lock means for locking said first and second members against mutual rotational motion about the longitudinal axes of said internal and external surfaces with said latch means so latching said first and second members together and with said first and second members mutually rotated to tighten said latch means in said groove of said other connector member not carrying said latch means.

9. Apparatus as defined in claim 2 wherein said first and second members may be released from mutual latching by said latch means by mutual rotational movement of said first and second members about the longitudinal axes of said internal and external surfaces.

10. Apparatus as defined in claim 1 wherein said first and second members, so latched together by said latch means, may be mutually rotated about the longitudinal axes of said internal and external surfaces to tighten said latch means in said groove of said other connector member not carrying said latch means.

11. Apparatus as defined in claim 1 further comprising seal means carried by at least one of said first and second members for sealing engagement with the other of said members when said first member is so received within said recess of said second member and said latch means so extends into both said grooves carried by said corresponding surfaces of said first and second members to so latch said first and second members together.

12. Apparatus as defined in claim 1 further comprising:
   a. at least one internal receptacle surface as part of said first member; and
   b. at least one external guide surface as part of said second member, generally receivable by such receptacle surface of said first member when said second member is so received within said first member to urge said first and second members into mutual alignment.

13. Apparatus as defined in claim 12 wherein:
   a. said internal and external surfaces are each generally cylindrical, and said corresponding grooves are generally cylindrical; and b. said latch means is generally cylindrical.

14. Apparatus as defined in claim 1 further comprising:
   a. a first receptacle surface included in said first connector member and positioned toward one end of said internal surface thereof, and a second receptacle surface included in said first member and positioned toward the other end of said internal surface thereof; and
   b. a first guide surface included in said second connector member and positioned toward one end of said external surface thereof, and a second guide surface included in said second member and positioned toward the other end of said external surface thereof, such that, as said second member is being received within said first member, said first guide surface may be received within said first receptacle and said second guide surface may be received within said second receptacle to align said first and second members prior to said latch means being so driven within said groove of said member carrying said latch means by said surface of said other member.

15. Apparatus as defined in claim 1 further comprising rotational orientation means, carried by at least one of said first or second members, whereby said first and second members may be mutually rotationally oriented relative to the longitudinal axes of said internal and external surfaces for receipt of said second member by said first member.

16. Apparatus as defined in claim 15 further comprising turning means whereby, with said first and second members so latched together by said latch means, said first and second members may be mutually rotated to tighten said latch means against said other connector member not carrying said latch means to releasably lock said first and second member together.

17. Apparatus as defined in claim 15 further comprising lock means for locking said first and second members against mutual rotational motion about the longitudinal axes of said internal and external surfaces with said latch means so latching said first and second members together and with said first and second members mutually rotated to tighten said latch means in said groove of said other connector member not carrying said latch means.

18. Apparatus as defined in claim 1 further comprising lock means for locking said first and second members against mutual rotational motion about the longitudinal axes of said internal and external surfaces with said latch means so latching said first and second members together and with said first and second members mutually rotated to tighten said latch means in said groove of said other connector member not carrying said latch means.

19. Apparatus as defined in claim 1 wherein said first and second members may be released from such mutual latching by said latch means by mutual rotational movement of said first and second members about the axes of said internal and external surfaces.

20. Appratus as defined in claim 1 wherein:
   a. said internal and external surfaces are each generally cylindrical, and said corresponding grooves are generally cylindrical; and
   b. said latch means is generally cylindrical.

21. A tubular member comprising:
   a. a tubular section;
   b. a box connector at one end of said tubular section, including a recess defined, at least in part, by an internal surface broken by a helical groove;
   c. a pin connector at the other end of said tubular section including an external surface broken by a helical groove; and
   d. helical latch means for carrying by at least one of such connectors in the corresponding said helical groove, said latch means having a generally rectangular section and being anchored at both ends;
   e. wherein such internal surface of such box connector of one such tubular member may receive such external surface of a pin connector of a like tubular member, said internal and external surfaces being generally complementary and said corresponding grooves being of generally the same pitch, and one or the other of said box and pin connectors of said two tubular members carries such latch means, whereby said latch means is distorted radially about its cross section in said helical groove of said connector carrying said latch means by the surface of the other of said connectors, whereupon, with said helical grooves of said two connectors being generally aligned, said latch means relaxes to extend partly into the helical groove of said other connector as well as partly into the helical groove of the connector carrying said latch means to releasably latch said connectors together.

22. Apparatus as defined in claim 21 wherein:
   a. said internal and external surfaces of said box and pin connectors, respectively, are generally tapered and mutually complementary, and said corresponding grooves are generally conical; and
   b. said latch means is generally conical.

23. Apparatus as defined in claim 21 further comprising seal means carried by at least one of said pin and box connectors of such two tubular members for sealing engagement with the other of said connectors when said pin connector is so received within said recess of said box connector and said latch means so extends into both said grooves of said corresponding surfaces of said pin and box connectors to so latch said pin and box connectors together.

24. Apparatus as defined in claim 21 further comprising:
   a. at least one internal receptacle surface as part of such box connector; and
   b. at least one external guide surface as part of such pin connector, generally receivable by such receptacle surface of said box connector when said pin connector is so received within said box connector to urge said pin and box connectors into mutual alignment.

25. Apparatus as defined in clam 21 wherein said latch means features at least one profiled edge to facilitate distortion of said latch means upon said latch means being driven into said groove of said connector carrying said latch means.

26. Apparatus as defined in claim 21 further comprising rotational orientation means, carried by at least one of such pin or box connectors of such two tubular members, whereby said pin and box connectors may be mutually rotationally oriented relative to the longitudinal axes of said internal and external surfaces for receipt of said pin connector by said box connector.

27. Apparatus as defined in claim 26 further comprising rotation means whereby, with said pin and box connectors so latched together by said latch means, the pin and box connectors may be mutually rotated to tighten said latch means against said other connector no carrying said latch means to releasably lock said pin and box connectors together.

28. Apparatus as defined in claim 21 wherein said pin and box connectors of such two tubular members, so latched together by said latch means, may be mutually rotated about the longitudinal axes of said internal and external surfaces to tighten said latch means in said groove of said other connector not carrying said latch means.

29. Apparatus as defined in claim 21 further comprising lock means for locking said pin and box connectors of such two tubular members against mutual rotational motion about the longitudinal axes of said internal and external surfaces with said latch means so latching said pin and box connectors together and with said connectors mutually rotated to tighten said latch means in said groove of said other connector not carrying said latch means.

30. Apparatus as defined in claim 21 wherein said pin and box connectors of such two tubular members may be released from such mutual latching by said latch means by mutual rotational movement of said pin and box connectors about the longitudinal axes of said internal and external surfaces.

31. Apparatus as defined in claim 21 wherein:
a. said internal and external surfaces of said box and pin connectors, respectively, are generally cylindrical and mutually complementary, and said corresponding grooves are generally cylindrical; and
b. said latch means is generally cylindrical.

32. A method of making a connection between first and second members, said members including internal and external generally complementary surfaces, respectively, each such surface featuring a groove, and with one of said first or second surfaces carrying a generally rectangular cross section helical latch means in the corresponding groove, comprising the steps of:
a. inserting the end of said second member featuring said external surface into the end of said first member featuring said internal surface;
b. moving said two members mutually together so that said latch means is distorted radially rotationally with respect to its cross section in the groove of said member carrying said latch means by the surface of the other said member;
c. continuing to move said first and second members together so that said grooves generally align permitting said latch means to relax and thereby extend partly into the groove of said member carrying said latch means and partly into the groove of the other said member to latch said first and second members together.

33. A method as defined in claim 32 further comprising the step of mutually rotating said first and second members with said latch means so latching said members together to tighten said latch means in the groove of the other said member not carrying said latch means.

34. A method as defined in claim 33 wherein said internal and external surfaces are complementarily tapered so that said corresponding grooves are conical, and said latch means is conical.

35. A method as defined in claim 33 further comprising the additional step of releasing said first and second members by mutually rotating said first and second members in the sense opposite to that rotated to so tighten said latch means in said groove of said other member.

36. A method as defined in claim 32 further comprising the step of releasing said first and second members from said latch means by mutually rotating said first and second members in the opposite sense of said helical grooves and latch means.

37. A method as defined in claim 32 wherein said internal and external surfaces are complementarily tapered so that said corresponding grooves are conical, and said latch means is conical.

38. A method as defined in claim 32 wherein said internal and external surfaces are complimentarily generally cylindrical so that said corresponding grooves are generally cylindrical, and said latch means is generally cylindrical.

* * * * *